US009027231B2

(12) United States Patent
Mimura et al.

(10) Patent No.: US 9,027,231 B2
(45) Date of Patent: May 12, 2015

(54) ASSEMBLING APPARATUS AND PRODUCTION SYSTEM

(75) Inventors: Toshihiko Mimura, Tokyo (JP); Yuichi Someya, Tokyo (JP); Yuji Matsuo, Utsunomiya (JP); Mikio Nakasugi, Tama (JP); Ken Meisho, Yokohama (JP); Masaichi Sato, Tokyo (JP); Mahito Negishi, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 288 days.

(21) Appl. No.: 13/702,119

(22) PCT Filed: Jun. 22, 2011

(86) PCT No.: PCT/JP2011/064851
§ 371 (c)(1),
(2), (4) Date: Dec. 5, 2012

(87) PCT Pub. No.: WO2012/002405
PCT Pub. Date: Jan. 5, 2012

(65) Prior Publication Data
US 2013/0086801 A1 Apr. 11, 2013

(30) Foreign Application Priority Data

Jun. 28, 2010 (JP) ................................. 2010-146197
Jun. 10, 2011 (JP) ................................. 2011-130513

(51) Int. Cl.
*B23P 21/00* (2006.01)
*B25J 19/02* (2006.01)
(Continued)

(52) U.S. Cl.
CPC .............. *B23P 21/00* (2013.01); *B25J 9/0084* (2013.01); *B25J 21/00* (2013.01)

(58) Field of Classification Search
CPC .... B23P 19/102; B23P 19/105; B25J 9/0009; B25J 9/0084; B25J 9/0087; B25J 9/0096; B25J 9/1694; B25J 9/1697; B25J 21/00
USPC ............... 29/720, 721; 294/106, 111, 2, 86.4, 294/103.1, 207, 119.1, 118, 34, 155, 900; 414/729, 739
See application file for complete search history.

(56) References Cited

U.S. PATENT DOCUMENTS 6,745,108 B1 * 6/2004 McGuire ....................... 700/291
7,650,679 B2 1/2010 Bidaud et al.
(Continued)

FOREIGN PATENT DOCUMENTS

CN 101031387 A 9/2007
CN 101375220 A 2/2009
(Continued)

OTHER PUBLICATIONS

Jul. 17, 2014 Chinese Office Action issued in a foreign counterpart Chinese Patent Application No. 201180031380.X.
(Continued)

*Primary Examiner* — David Bryant
*Assistant Examiner* — Jason L Vaughan
(74) *Attorney, Agent, or Firm* — Fitzpatrick, Cella, Harper & Scinto

(57) ABSTRACT

To enable positioning a robot arm and a workpiece with high accuracy while reducing vibrations of a camera. According to the claimed invention for this purpose, a robot station 100 includes a pedestal 103 to which robot arms 101 and 102 are fixed, a camera 106 which images an area including a working area 209 of the pedestal 103, and a booth 104 to which the camera 106 is fixed. The pedestal 103 is fixed to a floor surface, and the booth 104 is fixed to the floor surface without contacting the pedestal 103. The booth 104 is formed in the shape of a rectangular parallelepiped having a short side parallel to a workpiece conveying direction T and a long side perpendicular to the workpiece conveying direction T in a plan view. In the booth 104, the length of the long side y of the booth 104 is set to not less than the sum of a maximum length by which the robot arms 101 and 102 protrude from the pedestal 103 in a direction perpendicular to the workpiece conveying direction T and the length in the direction perpendicular to the workpiece conveying direction T of the pedestal 103 in a plan view.

12 Claims, 10 Drawing Sheets

(51) Int. Cl.
  *B25J 9/00*    (2006.01)
  *B25J 21/00*   (2006.01)

(56) References Cited

U.S. PATENT DOCUMENTS

| | | | |
|---|---|---|---|
| 8,352,076 | B2 | 1/2013 | Someya |
| 8,403,387 | B2 | 3/2013 | Nakasugi et al. |
| 8,790,064 | B2 * | 7/2014 | Dorner et al. ............ 414/783 |
| 2007/0245537 | A1 | 10/2007 | Bidaud et al. |
| 2009/0018690 | A1 | 1/2009 | Negre |
| 2011/0258847 | A1 | 10/2011 | Meisho et al. |
| 2013/0055560 | A1 | 3/2013 | Nakasugi et al. |

FOREIGN PATENT DOCUMENTS

| | | | |
|---|---|---|---|
| DE | 19753603 | A | 6/1999 |
| JP | 2008-229738 | A | 10/2008 |
| JP | 2009-148869 | A | 7/2009 |
| JP | 2009-269110 | A | 11/2009 |
| JP | 2010-105106 | A | 5/2010 |

OTHER PUBLICATIONS

Notification of Transmittal of the International Search Report and the Written Opinion of the International Searching Authority, the International Search Report, and the Written Opinion of the International Searching Authority dated Nov. 4, 2011.

* cited by examiner

ASSEMBLING APPARATUS AND PRODUCTION SYSTEM

TECHNICAL FIELD

The present invention relates to an assembling apparatus having a robot arm and a production system including a combination of a plurality of assembling apparatuses.

BACKGROUND ART

In recent years, small electrical and electronic products have been produced in more varieties and in smaller quantities, and the product life cycles of the products have been shortening. Production lines for producing the products tend to be frequently reconfigured to suit products to be produced. In a transition to another product on such a production line, changes to the production line require time, and a specialized jig needs to be produced. If products are not to be produced in somewhat large quantities, manual cell production is often adopted instead of an automated production line. However, even in this case, automation of a production line is needed to, e.g., stabilize the quality of products and deal with a rapid increase in production.

For this reason, general-use assembling apparatuses have recently attracted attention (see Japanese Patent Application Laid-Open No. 2009-148869). A production system including such assembling apparatuses uses a robot arm to machine and convey a workpiece serving as an object to be machined, and the plurality of assembling apparatuses can be rearranged according to each production plan to construct a new production system. In the event of a rapid increase in production, a general-use assembling apparatus can be removed from another production system whose production capacity is to be reduced and can be used in a new production system.

Important factors in fabricating the above-described assembling apparatuses include a reduction in the footprint of each assembling apparatus. Even a general-use assembling apparatus has few advantages if the assembling apparatus has a large footprint relative to a human assembly line. In contrast, in each assembling apparatus described in Japanese Patent Application Laid-Open No. 2009-148869, a robot arm with not less than six degrees of freedom is fixed to a side wall of a chassis, and a general-use camera with a wide field of view is fixed to a ceiling portion of the chassis. The installation space is minimized by canceling out a tolerance between the position of each robot arm and the position of a workpiece using a result of imaging by the camera and changing an operating program so as to perform various pieces of work. With this configuration, the assembling apparatus is available in many production sites.

However, since a robot arm is fixed to a side wall of a chassis in a conventional assembling apparatus, the chassis is unstable to swings of the robot arm. Vibrations different from vibrations to which a workpiece is subjected due to swings of the robot arm are applied to the camera provided at the ceiling portion, and the vibrations reduce the detection accuracy of the camera. Methods for avoiding the problem include a process of performing imaging by the camera after swings of the camera converge. In this method, a ceiling surface needs to be located at a somewhat large height for securing a workspace for the robot arm. This lengthens the swing period of the chassis. Once the chassis starts vibrating, it takes a long time for swings of the camera to converge. Accordingly, waiting until swings of the camera converge leads to an increase in a period of time during which the work of the robot arm is stopped, which causes a reduction in the pace of production.

Under the circumstances, it is an object of the present invention to provide an assembling apparatus capable of reducing vibrations of a camera which images the working area of a robot arm and a production system using the assembling apparatus.

CITATION LIST

Patent Literature

PTL 1: Japanese Patent Application Laid-Open No. 2009-148869

SUMMARY OF INVENTION

The present invention is an assembling apparatus which includes at least one robot arm capable of the work of assembling a workpiece and a pedestal to which the robot arm is fixed and in which the robot arm grips a workpiece and conveys the workpiece in a workpiece conveying direction. The apparatus includes a frame with a framed structure which is arranged to surround the pedestal and a camera which is fixed at an upper portion of the frame and can image an area including a working area for the robot arm. The pedestal and frame are fixed to a floor surface while being out of contact with each other, the frame is formed in a shape of a rectangular parallelepiped having a short side parallel to a workpiece conveying direction and a long side perpendicular to the workpiece conveying direction in a plan view, and the length of the long side of the frame is set to be not less than the sum of a maximum length by which the robot arm protrudes from the pedestal in a direction perpendicular to the workpiece conveying direction and the length in the direction perpendicular to the workpiece conveying direction of the pedestal in a plan view.

According to the present invention, the pedestal to which the robot arm is fixed and the frame to which the camera is fixed are fixed to the floor surface while being out of contact with each other. Accordingly, even when the robot arm swings, the swing can be prevented from being transmitted to the frame, and vibrations of the camera can be reduced. Additionally, in the frame, the length of the long side of the frame is set to be not less than the sum of the maximum length by which the robot arm protrudes from the pedestal in the direction perpendicular to the workpiece conveying direction and the length of the pedestal in a plan view. The frame is thus installed on the floor surface with an installation area larger than the installation area of the pedestal. As a result, the frame is more stable to vibrations and can effectively reduce vibrations of the camera.

Further features of the present invention will become apparent from the following description of exemplary embodiments with reference to the attached drawings.

DESCRIPTION OF EMBODIMENTS

Embodiments of the present invention will be described in detail below with reference to the drawings.

First Embodiment

Figure 1:
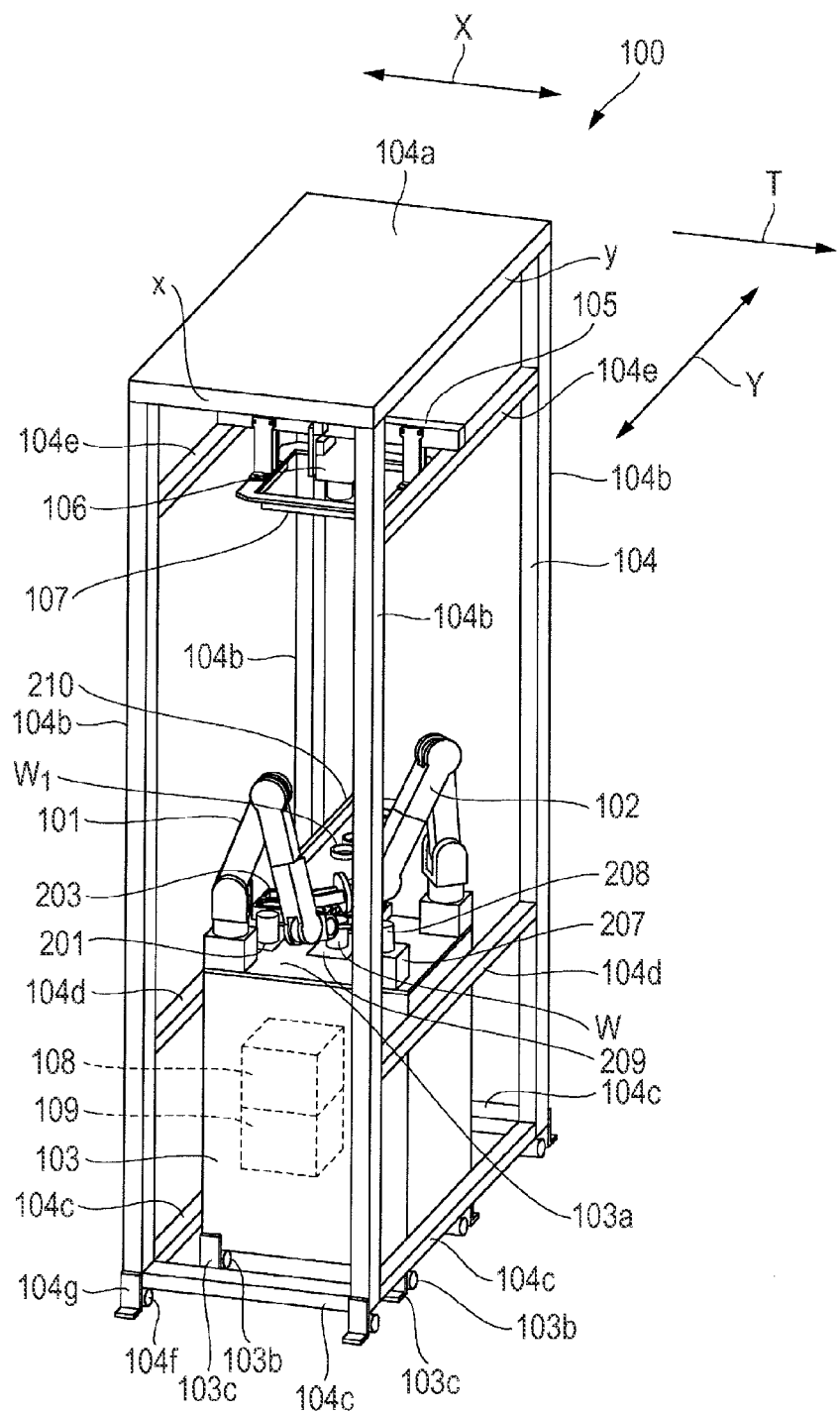
FIG. 1 is a perspective view illustrating the schematic configuration of an assembling apparatus to be incorporated in a production system according to a first embodiment of the present invention.

FIG. 1 is a perspective view illustrating the schematic configuration of an assembling apparatus to be incorporated in a production system according to a first embodiment of the present invention. Note that although the first embodiment will describe a case where a lens barrel is used as a workpiece W serving as an object to be machined and another workpiece $W_1$ (e.g., one of various parts) is assembled to the workpiece W, the present invention is not limited to this. Changes may optionally be made without departing from technical ideas of the present invention. In each of the drawings to be referred to in the following description, each part uses a different scale and different numerical values from the scale and numerical values of an actual structure for easy understanding of the configuration.

An assembling apparatus (hereinafter referred to as a "robot station") 100 illustrated in FIG. 1 includes two robot arms 101 and 102, a pedestal 103 to which the robot arms 101 and 102 are fixed, and a frame (hereinafter referred to as a "booth") 104 with a framed structure surrounding the pedestal 103. The robot station 100 also includes a camera 106, a luminaire 107, and a camera fixture 105 for fixing the camera 106 and luminaire 107 to the booth 104. The robot arms 101 and 102, pedestal 103, booth 104, camera fixture 105, camera 106, and luminaire 107 constitute one unit.

The robot arms 101 and 102 are each a six-axis robot arm. A corresponding one of different end effectors can be selected for a target one of various pieces of work and be attached to the distal end of each of the robot arms 101 and 102. The term end effector here refers to a portion corresponding to a finger of a human. For example, a tweezers hand including a pair of tweezers capable of detailed work is mounted as an end effector to the robot arm 101. A gripper hand in charge of conveying a relatively large member such as a lens barrel is mounted as an end effector to the robot arm 102. With this configuration, the robot arms 101 and 102 can perform the work of assembling workpieces W and $W_1$. Note that the robot arm 102 can convey a workpiece to a pedestal or the like (not illustrated) arranged downstream of the robot arm 102 in a workpiece conveying direction T by gripping the workpiece and pivoting.

The proximal ends of the robot arms 101 and 102 are fixed to the pedestal 103. The pedestal 103 is a housing which provides a workspace for the robot arms 101 and 102 to perform various pieces of work. In the first embodiment, a top plate 103a of the pedestal 103 serves as a workspace and has a square shape. The proximal ends of the two robot arms 101 and 102 in total are fixed to two corners in a diagonal relationship, respectively, of the four corners of the top plate 103a. Note that the pedestal 103 includes stainless-steel support posts and side boards and the top plate 103a and that the robot arms 101 and 102 are firmly fixed to the stainless-steel support posts via the top plate 103a.

The robot arms 101 and 102 can use, as a work space, the whole top plate 103a of the pedestal 103 except portions where the robot arms 101 and 102 are fixed. Holes are formed at regular intervals in the top plate 103a for fixing a base on which various processing tools available to the robot arms 101 and 102 are to be mounted, a tray for holding parts, and the like. Various bases and trays can be positioned with fixed accuracy by fixing the bases and trays to the holes. A marker (not illustrated) used for calibration may be made on the top plate 103a. Markers are preferably formed near the four corners of the top plate 103a except the two corners where the robot arms 101 and 102 are fixed, i.e., near the other two corners.

A central portion of the workspace in the top plate 103a of the pedestal 103 is a working area 209 for cooperative work by the pair of robot arms, 101 and 102, such as assembly work. A workpiece W is mounted in the working area 209. Note that a marker for alignment with the center point of a lens barrel is made at the center of the working area 209. An upstream edge in the workpiece conveying direction of the top plate 103a is an area 201 for temporarily placing a workpiece W conveyed from the adjacent robot station 100. A workpiece W to which a workpiece $W_1$ is to be assembled is temporarily placed in the area 201.

A parts feeding apparatus 210 to which a workpiece $W_1$ to be assembled to a workpiece W is supplied is arranged above around one of the two corners of the top plate 103a different from the two corners where the pair of robot arms, 101 and 102, are arranged. A tray 203 on which a workpiece $W_1$ is to be mounted is arranged at the one corner of the top plate 103a. A stage 207 on which a coating apparatus 208 for applying adhesive when a workpiece $W_1$ is assembled to a workpiece W is mounted is arranged at the other corner of the top plate 103a.

In the first embodiment, the robot station 100 includes a controller 108 which generates command values to be output to motors incorporated in the robot arms 101 and 102 for controlling the motors. The controller 108 is arranged inside the housing of the pedestal 103 as the housing. The robot station 100 also includes an image processing apparatus 109 which causes the camera 106 to perform imaging and processes an image obtained by the imaging. The image processing apparatus 109 is also arranged inside the housing of the pedestal 103 as the housing. Tolerances associated with robot control of the robot arms 101 and 102 themselves, tolerances of workpieces W and $W_1$ themselves such as an object to be machined and a part, and various tolerances caused by disturbances such as heat and light are present. The controller 108 corrects robot command values based on a processing result from the image processing apparatus 109 and causes the tolerances to fall within permissible ranges.

The pedestal 103 is installed on a floor surface. Since the total weight of the pedestal 103 including the robot arms 101 and 102, controller 108, and image processing apparatus 109 is significant, casters 103b for movement of the pedestal 103 are attached to the bottom surface of the pedestal 103. Screw type fixing brackets 103c for fixation to the floor surface are mounted to the pedestal 103 such that the pedestal 103 is stable when the pedestal 103 is installed on the floor surface. The fixing brackets 103c are fixed to the floor surface by anchor bolts (not illustrated) driven into the floor surface and can minimize vibrations caused by operation of the robot arms 101 and 102.

The booth 104 serving as a frame is a framework in the shape of a rectangular parallelepiped which is assembled from rigid support posts and beams for fixing the camera 106 such that a camera imaging surface is parallel to the top plate 103a serving as the workspace of the pedestal 103. The booth 104 with a framed structure includes a top board 104a which is rectangular in a plan view, four support posts 104b which extend vertically downward from the top board 104a, and four beams 104c which connect lower ends of each two adjacent ones of the support posts 104b. The booth 104 also includes pairs of beams (104d and 104e) which are parallel to a long side direction Y. Each beam is arranged between two of the support posts 104b to couple the two support posts 104b. The pair of beams 104e is provided at an upper portion of the booth 104, and the other pair 104d of beams is provided at a substantially vertically central portion of the booth 104. With this framed structure, the booth 104 is formed in the shape of a rectangular parallelepiped having a long side y and a short side x in a plan view. The booth 104 is arranged such that the short side x is parallel to the workpiece conveying direction T in a plan view (the long side y is perpendicular to the workpiece conveying direction T in a plan view). Note that casters 104f for movement are attached to the lower ends of the four support posts 104b. Fixing brackets 104g which are fixed to the floor surface by the anchor bolts (not illustrated) driven into the floor surface are attached to the lower ends of the four support posts 104b. With this configuration, the booth 104 is fixed to the floor surface while being out of contact with the pedestal 103.

The camera 106 is fixed to the upper portion of the booth 104 by the camera fixture 105 such that the camera 106 has an angle of view which enables viewing of the whole top plate 103a including the working area 209 for cooperative work by the robot arms 101 and 102 and such that the optical axis of the camera 106 is perpendicular to the top plate 103a. The camera fixture 105 ensures parallelism using grooves in the beams 104e of the booth 104 and is threadably fixed to a required position. The camera fixture 105 can fix not only the camera 106 but also the luminaire 107. In the first embodiment, the luminaire 107 is an LED luminaire in the shape of a square ring which is arranged around a lens of the camera 106 and applies uniform light to a workpiece W in the working area 209. The camera 106 needs to have a wide field of view and is preferably a high-resolution one. More specifically, the camera 106 preferably has a resolution of not less than 10 megapixels. The camera 106 and the image processing apparatus 109 are connected according to the Camera Link standard that is a general FA standard. Since the camera 106 is fixed to the booth 104, as described above, the camera 106 can image the whole top plate 103a, which is a workspace including the working area 209 of the pedestal 103.

Figure 2:
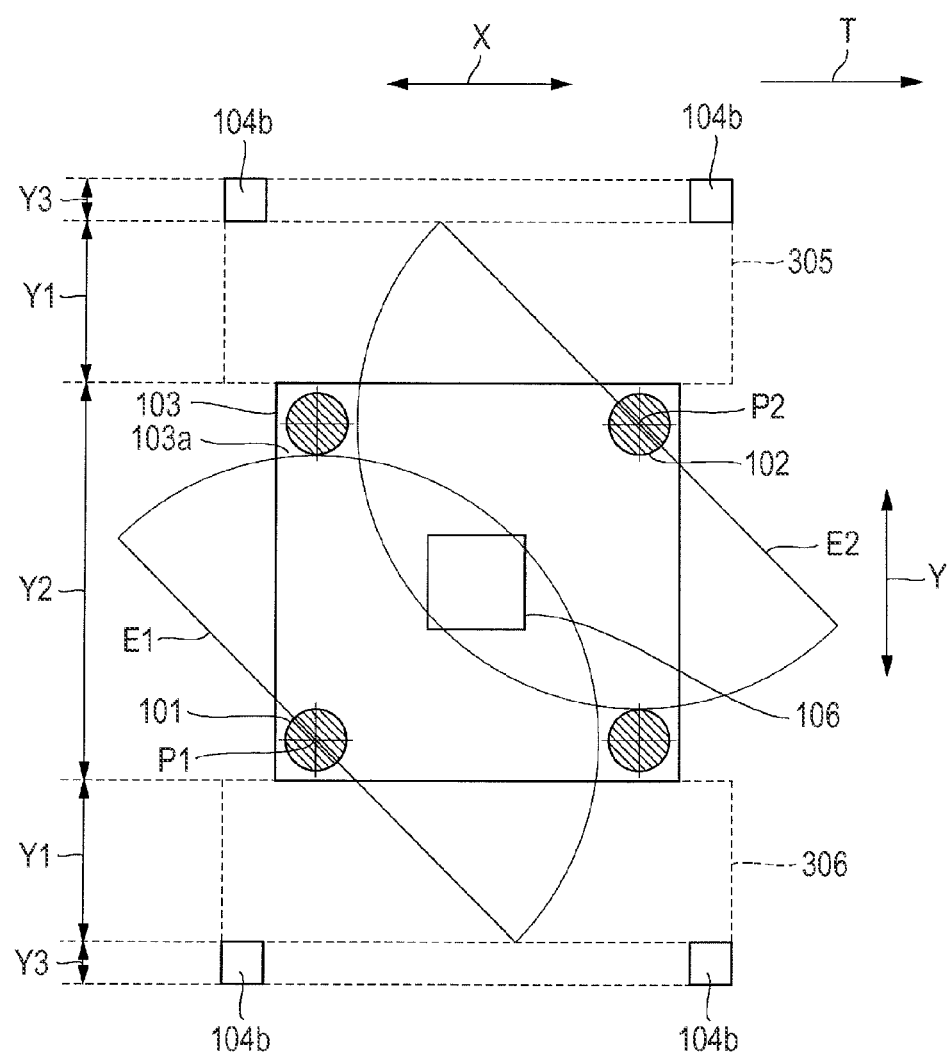
FIG. 2 is a schematic view of the assembling apparatus as viewed from above.

FIG. 2 is a schematic view of the assembling apparatus (robot station) as viewed from above and illustrates the positional relationship among the pedestal 103, robot arms 101 and 102, and booth 104 and a position where the camera 106 is installed. Referring to FIG. 2, a point P1 indicates the rotation center of a first axis of the robot arm 101 while a point P2 indicates the rotation center of a first axis of the robot arm 102. A range E1 indicates a range of movement which the end effector of the robot arm 101 covers when the first axis of the robot arm 101 is pivoted. Similarly, a range E2 indicates a range of movement which the end effector of the robot arm 102 covers when the first axis of the robot arm 102 is pivoted. In FIG. 2, the range of pivotal movement of the first axis of each of the robot arms 101 and 102 is ±90° with respect to a direction from the corresponding corner of the top plate 103a of the pedestal 103 toward the center, i.e., 180°. The ranges E1 and E2 of movement of the robot arms 101 and 102 and the end effectors protrude from the booth 104 in a short side direction X. This is because the robot arms 101 and 102 also serve as units for conveying a workpiece W.

The booth 104 is sized so as not to contact the pedestal 103 and robot arms 101 and 102 even when the booth 104, pedestal 103, and robot arms 101 and 102 vibrate. More specifically, let Y1 be a maximum length by which each of the robot arms 101 and 102 protrudes from the pedestal 103 in the long side direction Y in a plan view; Y2, a length in a direction perpendicular to the workpiece conveying direction T of the pedestal 103; and Y3, a width of each support post 104b in the direction perpendicular to the workpiece conveying direction T, as illustrated in FIG. 2. The length of the long side y of the booth 104 is set to be not less than the sum of a maximum length by which the robot arms 101 and 102 protrude from the pedestal 103 in the direction perpendicular to the workpiece conveying direction T, Y1×2, and the length in the direction perpendicular to the workpiece conveying direction T of the pedestal 103, Y2. That is, it suffices that the robot arms 101 and 102 do not protrude from the booth 104 in the direction perpendicular to the workpiece conveying direction T when the robot arms 101 and 102 pivot. Since the two robot arms are provided in the first embodiment, the maximum length, by which the robot arms protrude from the pedestal 103, is Y1×2. In the case of only one robot arm, the maximum length is Y1.

In the first embodiment, the length of the long side y of the booth 104 is set to Y1×2+Y2+Y3×2. With this configuration, the robot arms 101 and 102 do not protrude from the booth 104 in the direction perpendicular to the workpiece conveying direction T. Since there is room corresponding to the width Y3 of each support post 104b on each side, even if side boards or the like are provided at frame side surfaces on the short side x side of the booth 104, the robot arms are prevented from contacting the side boards. An increase in the size of the booth 104 is curbed.

The height of the booth 104 is set to the sum of the maximum height that the robot arms 101 and 102 can reach, the height of the pedestal 103, the dimension for installing the camera 106, and the width of each support post 104b. The pedestal 103 is installed at a central portion of an area where the booth 104 is installed.

With the above-described configuration, spaces indicated by broken-line areas 305 and 306 are formed between the pedestal 103 and the booth 104, as illustrated in FIG. 2. The spaces indicated by the broken-line areas 305 and 306 prevent the robot arms 101 and 102 from protruding from the booth 104 in the long side direction Y and increase the footprint of the booth 104. As a result, the booth 104 has a structure resistant to swings.

Figure 3:
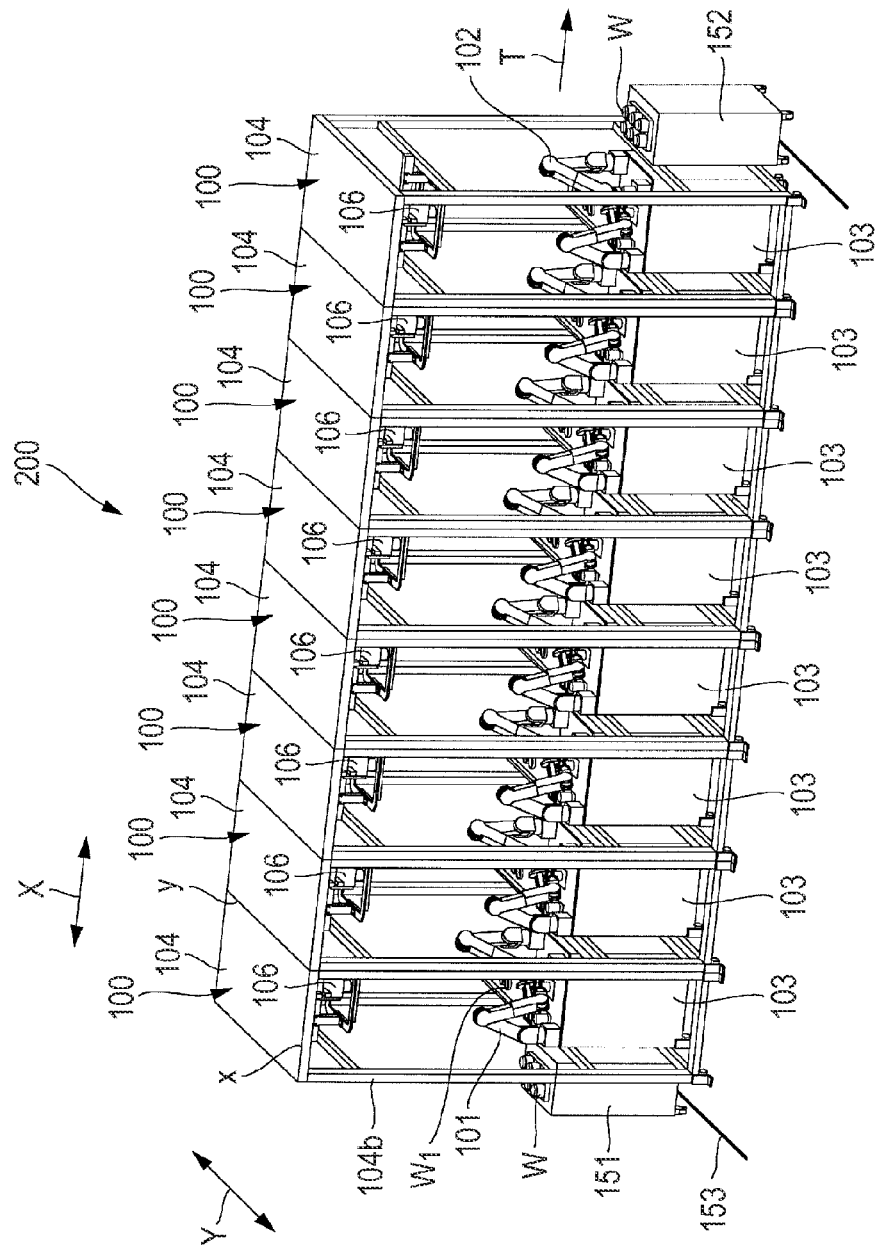
FIG. 3 is a perspective view of a production system including a combination of a plurality of assembling apparatuses.

FIG. 3 is a perspective view of a production system including a combination of a plurality of assembling apparatuses (robot stations). A production system (hereinafter referred to as a "robot cell") 200 includes the plurality of robot stations 100. That is, the robot cell 200 is built to have the plurality of robot stations 100 arranged along the workpiece conveying direction T. Accordingly, the broken-line areas 305 and 306 (FIG. 2) are provided in a direction perpendicular to the workpiece conveying direction T with respect to the pedestal 103, and the robot stations 100 with the same configuration are provided in a direction parallel to the workpiece conveying direction T. Two adjacent ones of the booths 104 are arranged such that frame side surfaces on the long side y side face each other. This configuration enables conveying of a workpiece W to the adjacent robot station 100 (the next process) by the robot arm 102.

A gap between adjacent ones of the pedestals 103 illustrated in FIG. 3 is slightly wider than the sum of the widths of the two support posts 104b. There is no room for a person between the adjacent pedestals 103 and 103, which poses no problem. One of a door and a fence (not illustrated) can be easily attached to the support posts 104b of each booth 104, and fences can be inexpensively built.

Since a human cell is a target for comparison, the installation area of each robot station 100 is very severely limited. For example, in assembly of a lens barrel, the workspace of one operator in a human cell is about 50 cm square. If each robot station 100 is brought within the same installation area, the booth 104 is formed in the shape of a rectangular parallelepiped long in a height direction in order to secure a space for movement of the six-axis robot arms 101 and 102. For this reason, once the robot station 100 starts vibrating, long-period vibrations occur in the booth. However, since the booth 104 and pedestal 103 are independently fixed to the floor surface in the first embodiment, the robot arms 101 and 102 and pedestal 103 do not contact a portion of each support post 104b of the booth 104. This enables vibrations of the robot arms 101 and 102 and pedestal 103 to be prevented from being directly transmitted to the booth 104. Accordingly, vibrations of the camera 106 can be reduced by fixing the pedestal 103 having the fixed robot arms 101 and 102 and the booth 104 having the fixed camera 106 to the floor surface independently of each other so as not to contact each other.

Each booth 104 is in the shape of a rectangular parallelepiped and has a low center of gravity. The stability to vibrations increases in correlation with the footprint (base area). Accordingly, vibrations of the camera 106 can be more effectively reduced. Additionally, since the plurality of booths 104 are arranged side-by-side, as illustrated in FIG. 3, the booths 104 as the whole robot cell are more stable to vibrations.

Possible methods for carrying in an object to be machined and carrying out a machined object include two methods. One is to provide fences and manually perform carrying in and carrying out using trays. The other is to perform carrying in and carrying out by automated guided vehicles 151 and 152 which move according to tapes 153 on the floor or the like, as illustrated in FIG. 3. Although either one of the methods may be used, use of the automated guided vehicles 151 and 152 is more desirable.

In the first embodiment, the top board 104a is arranged at the upper portion (ceiling portion) of each booth 104. The top board 104a is made of a plate material, such as an aluminum plate, treated with black anodized aluminum for prevention of diffused reflection and is arranged above the camera 106. Each top board 104a has the effect of blocking a disturbance caused by the interior lighting of a factory where the robot stations 100 are installed and preventing dust and the like floating in the factory from adhering to a workpiece W. The provision of the top board 104a increases the mechanical strength of each booth 104 and enables a more effective reduction in vibrations of the camera 106.

When the robot arms 101 and 102 are operated, the work of performing image processing using an image obtained through imaging by the camera 106 and correcting a command value, i.e., work called calibration is required. This is because the accuracy of attaching the camera 106 itself is limited, and target measurement accuracy cannot be achieved without calibration. Pieces of calibration work are broadly divided into two types. One is so-called camera parameter calibration including correcting, e.g., distortion in the camera 106 itself and tilt caused by a position where the camera 106 is attached. The other is calibration between camera coordinates and robot coordinates including constructing an equation representing the relationship between a coordinate position of the camera 106 obtained through measurement by the camera 106 and coordinate positions of the robot arms 101 and 102.

A known calibration chart is used for camera parameter calibration. First, calibration charts are placed at three positions on the pedestal 103 which are at least not collinear. A picture of the calibration charts is taken, and distortion in a picture surface of the camera 106, a tilt caused when the camera 106 is attached, a piece of dimensional information for each pixel of camera coordinates, and the like are acquired from known pieces of dimensional information of the calibration charts. The positional relationships between the pedestal 103 and the robot arms 101 and 102 are ensured by mechanical accuracy. For this reason, the positional relationship between camera coordinates and robot coordinates can be calculated from the camera coordinates information of calibration marks as described above made on the pedestal 103 and known pieces of positional information in the pedestal 103 by taking pictures of the calibration marks (or the calibration charts). Tolerances between a workpiece W and the robot arms 101 and 102 can be canceled out by transmitting the corrected robot coordinates commands to the robot arms 101 and 102 using the positional relationship. This principle can be applied to various work processes. Note that markers on the robot coordinates side need not be located at the pedestal 103. As long as the positional relationships between the pedestal 103 and the robot arms 101 and 102 are ensured by the mechanical accuracy, markers may be provided on the robot arms side, which poses no problem.

As described above, according to the first embodiment, the pedestal 103 on which the robot arms 101 and 102 are fixed and the booth 104 to which the camera 106 is fixed are fixed to the floor surface separately so as not to contact each other. Accordingly, even if the robot arms 101 and 102 and pedestal 103 vibrate, the vibrations can be prevented from being transmitted to the booth 104. The relative positional relationship among a workpiece W as an object to be machined which is mounted on the pedestal 103, a workpiece $W_1$ as a part, and the coating apparatus 208 as a tool remains unchanged even after swings. For this reason, even if vibrations do not converge, the camera 106 can perform imaging. When the image processing apparatus 109 performs image processing based on an image obtained through imaging, the image processing apparatus 109 can accurately measure positional information (a relative positional relationship) without being affected by swings.

Figure 4:
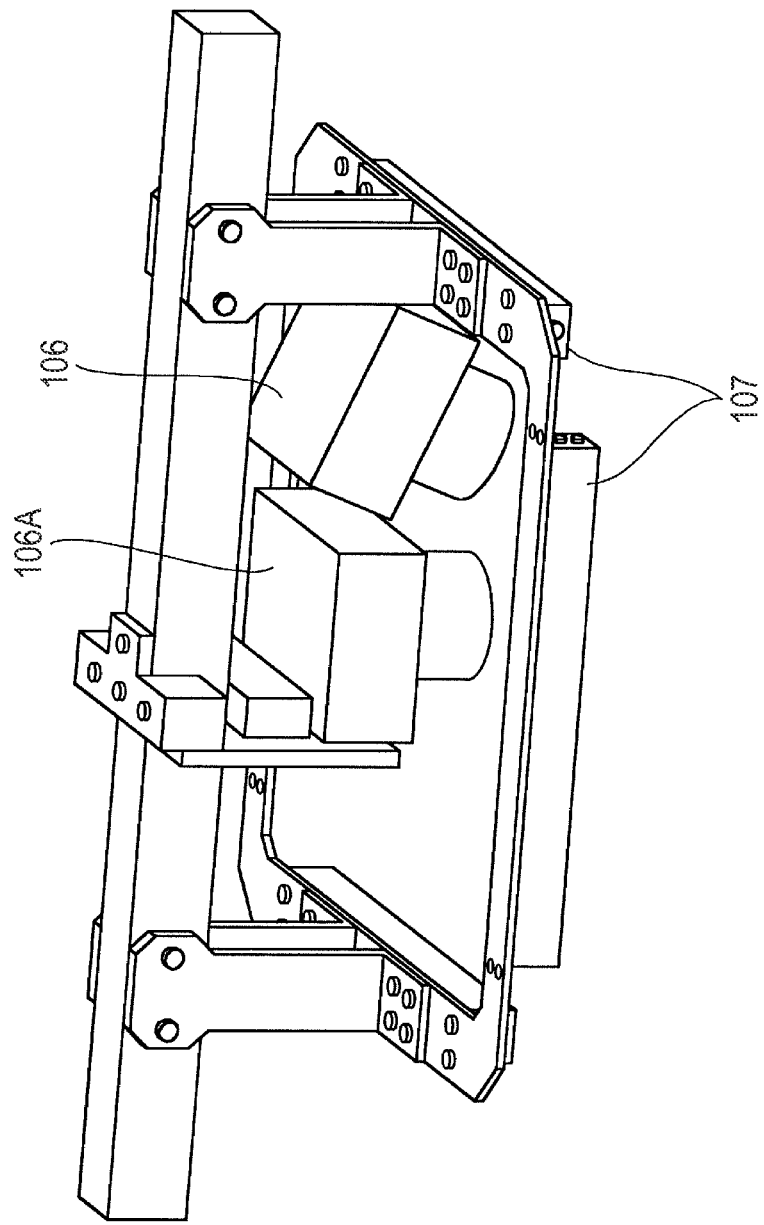
FIG. 4 is a perspective view of a camera.

Note that the number of cameras to be attached to each booth 104 need not be one. For example, as illustrated in FIG. 4, two cameras, 106 and 106A, may be arranged at the upper portion (ceiling portion) of the booth 104, and a wide field camera (global camera) with a view of the whole pedestal may be used as the camera 106. The other camera 106A may be arranged at a central portion of the upper portion as a narrow field camera (local camera) with a view of the working area 209 where a workpiece $W_1$ as a part is assembled to a workpiece W as an object to be machined. A resolution required for work may be selected and used. Since the global camera 106 is provided at a position off the central portion of the upper portion (ceiling portion) of the booth 104, the global camera 106 may be obliquely attached, as illustrated in FIG. 4.

That is, the local camera 106A is arranged at the central portion of each booth 104 immediately above the working area 209, and the global camera 106 is arranged at the position off the central position. Accordingly, the global camera 106 is fixed at an angle such that the optical axis of the camera 106 passes through the center position of the top plate 103a of the pedestal 103. With this configuration, the field of view of the global camera 106 can be set so as not to be limited to a portion. Note that if the sizes of the cameras themselves are small, the cameras need not be arranged in the above-described manner. The two cameras may be arranged side-by-side near the center of the ceiling portion such that the optical axes of the cameras are both perpendicular to the top plate of the pedestal. The global camera and the local camera are different only in viewing coverage. The two separate cameras are provided only to provide an appropriate resolution corresponding to a required degree of accuracy. Accordingly, if a required degree of accuracy can be achieved by a resolution of a camera whose field of view covers the whole pedestal top plate, the one camera will suffice.

Imaging operation by the global camera 106 and local camera 106A and image processing operation in the image processing apparatus 109 for the operation of one process of lens barrel assembly by each robot station 100 will be described with reference to FIGS. 1 and 4.

In putting the robot station 100 in operation, calibration of only the global camera 106 and calibration of the global camera 106 and the end effectors mounted to the robot arms 101 and 102 are first performed. Similarly, calibration of the local camera 106A is performed. The procedures for the operations are performed in the manner below.

(1) Three calibration plates are mounted at non-collinear positions in portions of the working area 209 of the pedestal top plate 103a within the viewing coverage of the global camera 106.

(2) A calibration program of the image processing apparatus 109 is then activated. After the activation of the program, the three calibration plates are automatically imaged. A camera parameter correction value for the single camera is calculated using image information obtained through the imaging by a known calibration method.

(3) The calibration plates are then removed. In this state, a camera-to-robot-arm calibration program is activated. After the activation of the program, the program causes the camera 106 to perform imaging, reads a mark made on the top plate 103a from an image obtained through the imaging, calculates the positional relationships between the end effectors of the robot arms 101 and 102 at predetermined positions from a fixed position of the top plate 103a, and obtains an equation for conversion from camera coordinates.

(4) The above calibration is similarly performed for the local camera 106A. In this manner, equations representing the positional relationships between the cameras 106 and 106A and the robot arms 101 and 102 are constructed. The robot arms 101 and 102 and end effectors installed at each robot station 100 then perform preprogrammed taught operations while correcting coordinates based on the relational equations.

Specific taught operations according to the first embodiment are as follows.

(1) The robot arm 102 is moved, and a workpiece W which is a lens barrel fed from the adjacent robot station 100 is gripped with the end effector. The end effector conveys the workpiece W to the working area 209 for assembly, and fixes the workpiece W to a predetermined position. The global camera 106 is used here. The global camera 106 simultaneously images a workpiece W in the area 201 where an object to be machined is to be temporarily placed and a marker made on the working area 209. An image obtained through the imaging is fed to the image processing apparatus 109, which calculates the center coordinates of the workpiece W which is a lens barrel and the center coordinates of the marker and passes the relative coordinates to the controller 108. Since the position of the marker is related to robot coordinates with known accuracy, the controller 108 outputs a command value to the robot arm 102 based on the robot coordinates of the center position of the workpiece W having undergone correction using the above-described relational equations and the relative coordinates. Upon receipt of the command value, the robot arm 102 moves to a position for picking up the workpiece W temporarily placed in the area 201 and grips the workpiece W. After that, the robot arm 102 moves the workpiece W to the position of the marker and releases the workpiece W at the position.

(2) When the workpiece W is fixed to the predetermined position of the working area 209, the robot arm 101 is moved. The robot arm 101 grips a wiring member jutting out from the workpiece W with the end effector and turns up the wiring member to a position at an upper portion of the workpiece W. The local camera 106A is used here. The local camera 106A simultaneously images the wiring member jutting out from the workpiece W placed in the working area 209, the workpiece W, and the marker provided on the pedestal top plate 103a. An image obtained through the imaging is fed to the image processing apparatus 109, which calculates the camera relative position between the center coordinates of the workpiece W and the coordinates of an endpoint of the wiring member. The image processing apparatus 109 also calculates the relative position coordinates between the center coordinates of the workpiece W and the marker. The controller 108 calculates a position at which the workpiece W and wiring member are gripped based on the position of the marker while performing coordinate conversion using the equation representing the relationship between robot coordinates and camera coordinates. The end effector performs the turning-up operation according to a taught operation.

(3) The robot arm 102 is then moved to grip the coating apparatus 208 mounted on the stage 207. The coating apparatus 208 gripped by the end effector of the robot arm 102 is moved to within the working area 209. The global camera 106 is used here. The global camera 106 simultaneously images a marker (not illustrated) made on an upper portion of the coating apparatus 208 and the workpiece W. An image obtained through the imaging is fed to the image processing apparatus 109. The image is converted into a motion command to the robot arm 102 and end effector in the same manner as in (1), and the operation is performed.

(4) The distal end of the gripped coating apparatus 208 is moved onto an adhesive application area of the workpiece W. Adhesive is ejected from the coating apparatus 208. The coating apparatus 208 has an application switch at a portion at which the coating apparatus 208 is gripped. The coating apparatus 208 is designed to eject a predetermined amount of adhesive when the coating apparatus 208 is firmly gripped to press the application switch. The local camera 106A is used here. The local camera 106A simultaneously images the workpiece W placed in the working area 209 and the marker made on the coating apparatus 208. An image obtained through the imaging is fed to the image processing apparatus 109, which extracts the application area from the image of the workpiece W obtained through the imaging and calculates the camera position coordinates of the center of the application area. The image processing apparatus 109 then extracts the marker and calculates the camera position coordinates of the center of the marker. Following the calculations, the image processing apparatus 109 calculates the relative position between the center position coordinates of the application area and the center position coordinates of the marker. The coordinates are fed to the controller 108. The robot arm 102 is instructed based on the known position of the marker to operate such that the two center coordinates coincide with each other. Adhesive is ejected from the coating apparatus 208.

(5) The robot arm 102 is moved to return the coating apparatus 208 to a predetermined position of the stage 207. The gripper hand serving as the end effector is opened, and the coating apparatus 208 is removed from the robot arm 102. The global camera 106 is used here. A circular hole for mounting the coating apparatus 208 is formed in the stage 207 for fixing the coating apparatus 208. The hole is conical. Even when the coating apparatus 208 is returned with somewhat low accuracy, the coating apparatus 208 fits in at the predetermined position. The global camera 106 images the hole in the stage 207 from above. At this time, the marker made on the coating apparatus 208 gripped by the end effector is simultaneously imaged. An image obtained through the imaging is fed to the image processing apparatus 109, which extracts a circular hole area and the marker from the image and calculates the center positions of the circular hole area and marker as camera coordinates. The image processing apparatus 109 calculates the relative position between the marker and the center coordinates of the circular hole area. The calculated relative camera coordinates are fed to the controller 108. The coating apparatus 208 is moved to a position where the two sets of center coordinates coincide with each other by using the robot arm 102, based on the center position of the circular hole. At the position, the end effector is opened, and the coating apparatus 208 is returned to the predetermined position of the stage 207.

(6) The robot arm 102 is moved, and a workpiece $W_1$ serving as a part to be assembled which is placed in the tray 203 is gripped with the end effector of the robot arm 102. The robot arm 102 is moved to move the workpiece $W_1$ to within the working area 209. A plurality of workpieces $W_1$ to be assembled is mounted on the tray 203 without overlaps. The workpieces $W_1$ are supplied from the parts feeding apparatus 210 arranged at a rear portion of the robot station 100 onto the tray 203. The global camera 106 is used here. The global camera 106 images workpieces $W_1$ mounted on the tray 203 and the workpiece W in the assembly working area 209 and sends out an image obtained through the imaging to the image processing apparatus 109. The image processing apparatus 109 selects a grippable one from among the workpieces $W_1$ based on the image and calculates the camera coordinates of the center position of the grippable workpiece $W_1$. The image processing apparatus 109 also calculates the camera coordinates of the center position of the workpiece W and the position of the marker on the pedestal top plate 103a. The image processing apparatus 109 feeds the calculated camera coordinates to the controller 108. The controller 108 moves the end effector of the robot arm 102 to a predetermined position based on the position of the marker on the pedestal top plate 103a and causes the end effector to grip the workpiece W. The controller 108 moves the workpiece $W_1$ into the working area 209 using the robot arm 102.

(7) The robot arm 102 is moved, and the workpiece $W_1$ is assembled to the workpiece W placed in the assembly working area 209. The local camera 106A is used here. The local camera 106A images the workpiece $W_1$ gripped by the end effector and the workpiece W in the assembly working area 209 and sends out an image obtained through the imaging to the image processing apparatus 109. The reason why imaging by the local camera 106A is performed again here is that the workpiece $W_1$ as a member to be attached may be deformed when being gripped to cause the center coordinates to be displaced and that a high degree of accuracy of dimension which cannot be achieved by the global camera 106 is required to assemble the workpiece $W_1$. The image obtained through the imaging by the local camera 106A is fed to the image processing apparatus 109, which calculates the center position of the gripped workpiece $W_1$ and the center position of the workpiece W in the assembly working area 209 as camera coordinates. The calculated camera coordinates are fed to the controller 108. The controller 108 moves the end effector based on the information and assembles the workpiece $W_1$ to the workpiece W with the end effector such that the center position of the gripped $W_1$ and the center position of the workpiece W coincide with each other.

(8) The workpiece W having the assembled workpiece $W_1$ is gripped again by the robot arm 102 and is conveyed to the area 201 for temporary placement of the adjacent robot station 100. The global camera 106 is also used here. Objects to be imaged are the workpiece W having the assembled part and the mark made on the pedestal top plate 103a. An image of the objects obtained through imaging is fed to the image processing apparatus 109. The image processing apparatus 109 calculates camera coordinates based on the center position of the workpiece W and the center position of the mark. The calculated camera coordinates are fed to the controller 108. The controller 108 moves the robot arm 102 to a predetermined position based on the information and causes the end effector to grip the workpiece W. When the workpiece W after the assembly is moved to the area 201 of the adjacent robot station 100, a high degree of accuracy is not required. Pieces of image information obtained from the cameras 106 and 106A are not used. The conveyance is performed only with machine accuracy, and the end effector opens and releases the workpiece W when the end effector reaches the predetermined position. This is the completion of the taught operations taught to the robot station 100 for one process. The operation returns to procedure (1), and a work process for a new workpiece W which is a lens barrel starts.

According to the first embodiment, the relative positional relationship among an object to be machined mounted on a pedestal, a part, and a tool remains unchanged even after swings. Even if vibrations do not converge, a camera can perform imaging, as described above. Accordingly, the relational positional relationships between two target positions can be calculated by image processing. When the robot vibrations have converged, robot coordinates obtained by adding relative position coordinates to the coordinates of a reference mark on a top plate of the pedestal are given as a command. This enables teaching work to be performed with stable accuracy without loss of pace. As a result, the pace of a robot station can be increased.

Note that acquisition of such a relative positional relationship through imaging may be unnecessary in an aspect where high accuracy is not required. For example, in procedure (8) of the first embodiment, a lens barrel is conveyed to an adjacent robot station by a robot arm. If accuracy enough to simply grip a lens barrel and place the lens barrel within a certain range is required, a lens barrel can be gripped and conveyed even with some swings. In the first embodiment, conveyance of a lens barrel to an adjacent robot station is performed by a taught operation only with mechanical accuracy without using a camera image after the lens barrel is gripped.

Note that possible methods for teaching work procedures to a robot station include known various methods. For example, teaching of an operation can be performed by providing a virtual CAD model of a robot station in a computer and reproducing a specific work procedure in the robot station by a simulation in computer CAD. If operation teachings produced in the simulation are passed to a controller as described above, the controller can perform an actual operation. An error occurs between a simulation and the real world due to various external factors, and operation does not work without change. For this reason, in the first embodiment, a camera imaging sequence is incorporated in each of simulations of processes to enable teaching of a taught operation of canceling out an error in a simulation using computer CAD.

Second Embodiment

Figure 5A:
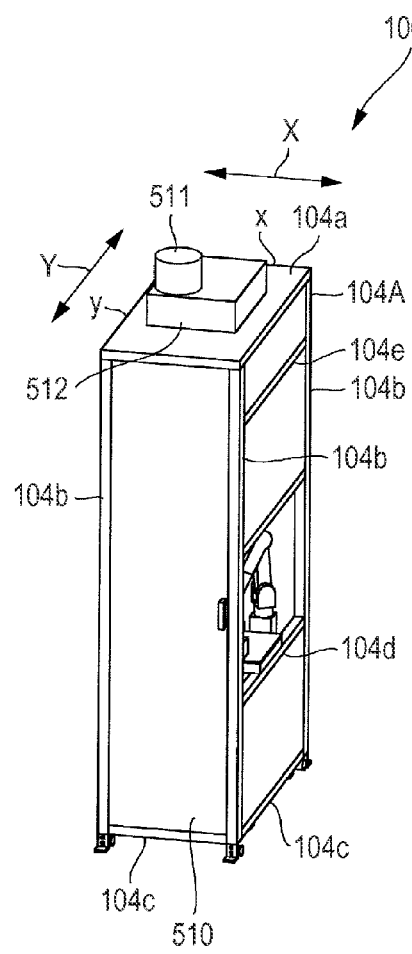
FIG. 5A is a perspective view illustrating the schematic configuration of an assembling apparatus with a door closed to be incorporated in a production system according to a second embodiment of the present invention.
Figure 5B:
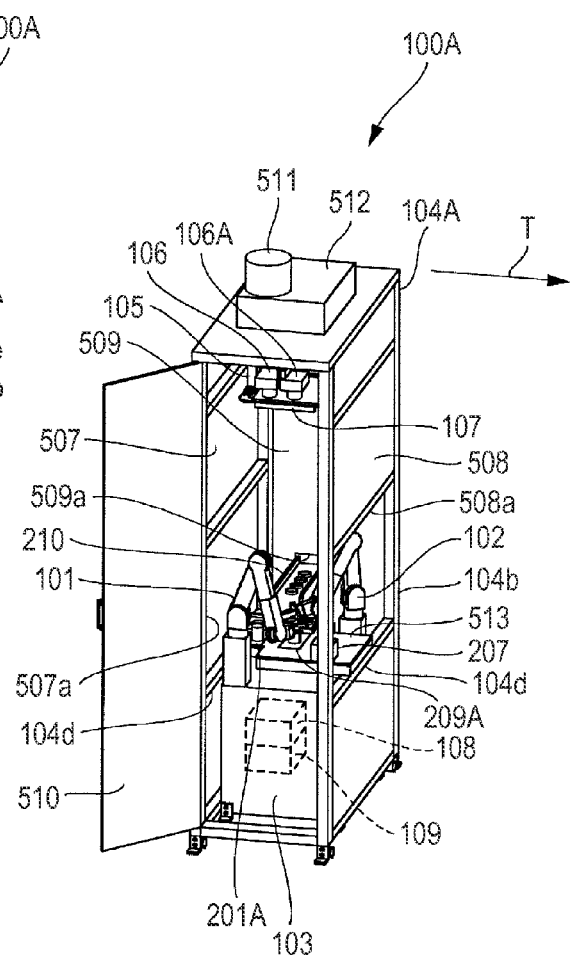
FIG. 5B is a perspective view illustrating the schematic configuration of the assembling apparatus with the door opened to be incorporated in the production system according to the second embodiment of the present invention.

FIGS. 5A and 5B are perspective views illustrating the schematic configuration of an assembling apparatus to be incorporated in a production system according to a second embodiment of the present invention. FIG. 5A is a view illustrating a state with a door closed, and FIG. 5B is a view illustrating a state with the door opened. The same components as the components in the first embodiment are denoted by the same reference numerals, and a description of the components will be omitted.

A robot station 100A as an assembling apparatus according to the second embodiment includes two robot arms 101 and 102, a pedestal 103 to which the robot arms 101 and 102 are fixed, and a booth 104A as a frame with a framed structure surrounding the pedestal 103. The robot station 100A also includes cameras 106 and 106A, a luminaire 107, and a camera fixture 105 for fixing the cameras 106 and 106A and luminaire 107 to the booth 104A.

In the second embodiment as well, the cameras 106 and 106A are fixed to an upper portion of the booth 104A and are adapted to be capable of imaging an area including a working area 209A for the robot arms 101 and 102. The pedestal 103 and booth 104A are fixed to a floor surface while being out of contact with each other. The booth 104A is formed in the shape of a rectangular parallelepiped having a short side x parallel to a workpiece conveying direction T and a long side y perpendicular to the workpiece conveying direction T in a plan view. In the booth 104A, the length of the long side y of the booth 104A is set to be not less than the sum of a maximum length by which the robot arms 101 and 102 protrude from the pedestal 103 in the direction perpendicular to the workpiece conveying direction T and the length in the direction perpendicular to the workpiece conveying direction T of the pedestal 103 in a plan view. More specifically, the length of the long side y of the booth 104A is set to be Y1×2+Y2+ Y3×2, as in FIG. 2. A top board 104a of the booth 104A is made of a plate material, such as an aluminum plate, treated with black anodized aluminum for prevention of diffused reflection and is arranged above the cameras 106 and 106A. This configuration is substantially the same as the configuration of the first embodiment and has the effect of reducing vibrations of the cameras 106 and 106A, as in the first embodiment.

In the second embodiment, a side board 507 having an opening portion 507a for carrying in a workpiece W is provided at an upstream frame side surface in the workpiece conveying direction T of the booth 104A, as illustrated in FIG. 5B. A side board 508 having an opening portion 508a for carrying out a workpiece W is provided at a downstream frame side surface in the workpiece conveying direction T of the booth 104A. A side board 509 having an opening portion 509a for carrying in a workpiece $W_1$ is provided at a frame side surface on a parts feeding apparatus 210 side of the booth 104A. The side boards 507, 508, and 509 are fixed to support posts and beams of the booth. An openable/closable door 510 is provided as a side board covering the whole frame side surface on a front frame side of the booth 104A, i.e., at a frame side surface on the non-workpiece-conveying side.

In the booth 104A, the opening portions 507a, 508a, and 509a are formed only at portions through which a workpiece is to be carried in and carried out, and most of the other portion is covered with the top board 104a, side boards 507, 508, and 509, and door 510. That is, the booth 104A except a gap between the floor surface and the booth 104A and the opening portions 507a, 508a, and 509a is covered with boards. The strength of the booth 104A is significantly increased by the side boards 507, 508, and 509, and the booth 104A is more resistant to vibrations. As described above, the rigidity of the booth 104A has improved rigidity, vibrations of the booth 104A are reduced, and vibrations of the cameras 106 and 106A can be effectively reduced.

The side boards 507, 508, and 509 are made of a plate material, such as an aluminum plate, treated with black anodized aluminum, like the top board 104a. The door 510 is a transparent plate member made of polycarbonate. A transparent plate member is used as the door 510 because an operator can detect an abnormality earlier when troubles arise in the robot station 100A. Note that the door 510 may be made of a plate material, such as an aluminum plate, treated with black anodized aluminum. In this case, the effects of exterior lighting on the robot station can be further reduced. As a result, the operation of the robot station is more stable.

The booth 104A except the opening portions for workpiece conveyance and the narrow gap formed between the floor surface and the booth can be made tight by closing the door 510. This enables dust to be prevented from entering the booth 104A and the interior of the booth 104A to be brought into a clean room condition. Accordingly, a workpiece such as an object to be machined or a part is cleaned, and disturbances caused by adhesion of dust and the like and defects in products due to the effects of dust can be effectively prevented.

In the second embodiment, a duct 511 for feeding clean air into a space surrounded by the booth 104A is further provided above the top board 104a through an air conditioning filter 512. With air supplied through the duct 511, the pressure inside the booth 104A is always set to be slightly higher than the pressure outside the booth 104A. This causes air to flow from inside the booth 104A to outside the booth 104A. Unclean air is inhibited from entering the booth 104A, the cleanliness inside the booth 104A is maintained, and dust and the like can be inhibited from adhering to a workpiece.

A workbench 513 on which a workpiece is to be mounted is fixed while being out of contact with the pedestal 103 in the booth 104A. The workbench 513 is arranged above the top plate 103a of the pedestal 103 so as not to contact the top plate 103a, inside the booth 104A. The workbench 513 is a plate-like rigid body having a predetermined thickness and is horizontally laid between a pair 104d of beams of the booth 104A and is fixed. The provision of the workbench 513 further improves the rigidity of the booth 104A, reduces vibrations of the booth 104A, and reduces vibrations of the cameras 106 and 106A.

Note that notches are formed at positions corresponding to the proximal ends of the robot arms 101 and 102 to avoid contact with the proximal ends of the robot arms 101 and 102. The workbench 513 is used as a workspace, and the robot arms 101 and 102 can work on the workbench 513. A central portion of the workbench 513 as the workspace is set as the working area 209A where assembly work can be performed by cooperative work by the pair of robot arms, 101 and 102. The area except the working area 209A on the workbench 513 includes an area 201A for temporarily placing a workpiece and an area where a stage 207 is to be arranged, like the first embodiment. Since the workspace where a workpiece is mounted and the robot arms perform assembly work is not located on the pedestal 103 in the second embodiment, holes for fixing tools and the like need not be formed at regular intervals in an upper surface of the pedestal. Instead of the holes, through holes for heat radiation are formed in the upper surface of the pedestal in consideration of heat radiated from a controller 108 and an image processing apparatus 109 incorporated in the pedestal.

As described above, in the second embodiment, the workbench 513 is fixed directly to the booth 104A and is supported by a structure out of contact with the pedestal 103 and robot arms 101 and 102. Accordingly, vibrations of the robot arms 101 and 102 as primary vibration sources are not transmitted to a workpiece. That is, vibrations of not only the cameras 106 and 106A but also the workbench 513 where the robot arms 101 and 102 work can be significantly reduced. For this reason, the cameras 106 and 106A provided at a ceiling portion of the booth 104A can perform stable imaging insusceptible to the effects of vibrations, and the accuracy of position measurement by the cameras 106 and 106A can be improved.

Figure 6A:
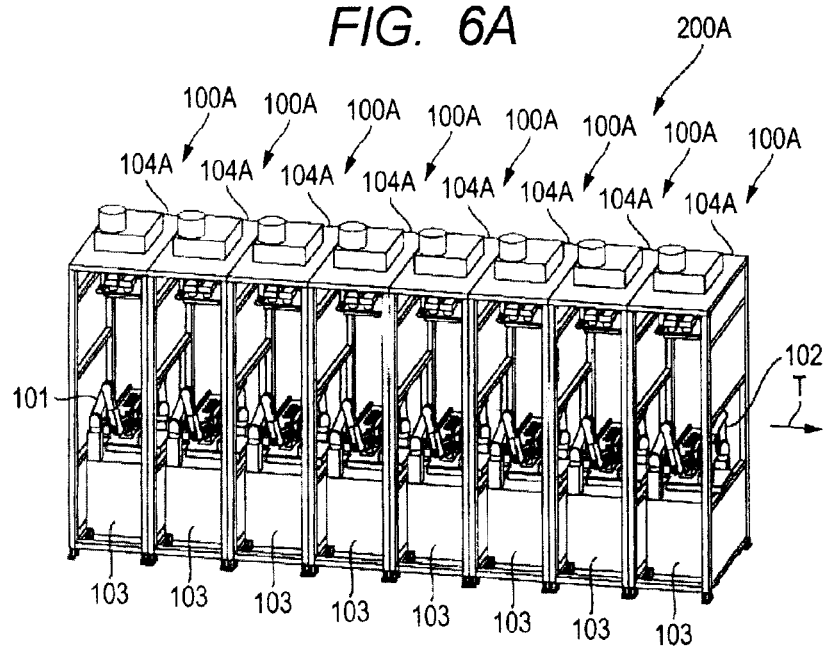
FIG. 6A is a perspective view of the production system including a combination of a plurality of assembling apparatuses whose doors are not illustrated.
Figure 6B:
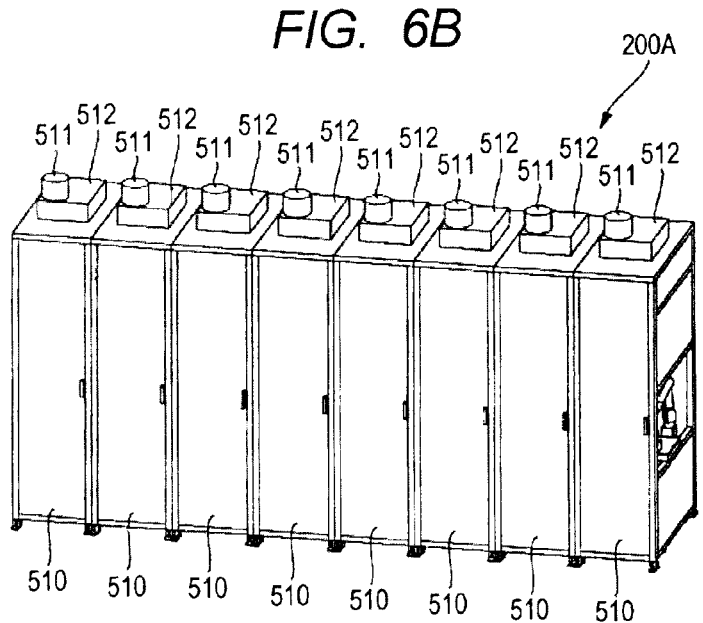
FIG. 6B is a perspective view of the production system including the combination of the plurality of assembling apparatuses with the doors closed.

FIGS. 6A and 6B are perspective views of a production system (robot cell) including a combination of a plurality of assembling apparatuses (robot stations). FIG. 6A is a view in which doors are not illustrated, and FIG. 6B is a view with the doors closed. As shown in FIGS. 6A and 6B, a robot cell 200A includes the plurality of robot stations 100A. More specifically, the robot cell 200A is constructed to have the plurality of robot stations 100A arranged side-by-side along the workpiece conveying direction T. Two of the booths 104A which are adjacent to each other are arranged such that frame side surfaces on the side of the long side face each other. This configuration enables conveyance of a workpiece to the adjacent robot station 100A (the next process) by the robot arm 102. The ducts 511 provided at the ceilings of the robot stations 100A are coupled by a duct (not illustrated) and connected to an air feeder (not illustrated) which produces clean air. Note that although automated guided vehicles are not illustrated in FIGS. 6A and 6B, the automated guided vehicles are arranged in the same manner as in the first embodiment.

Figure 7:
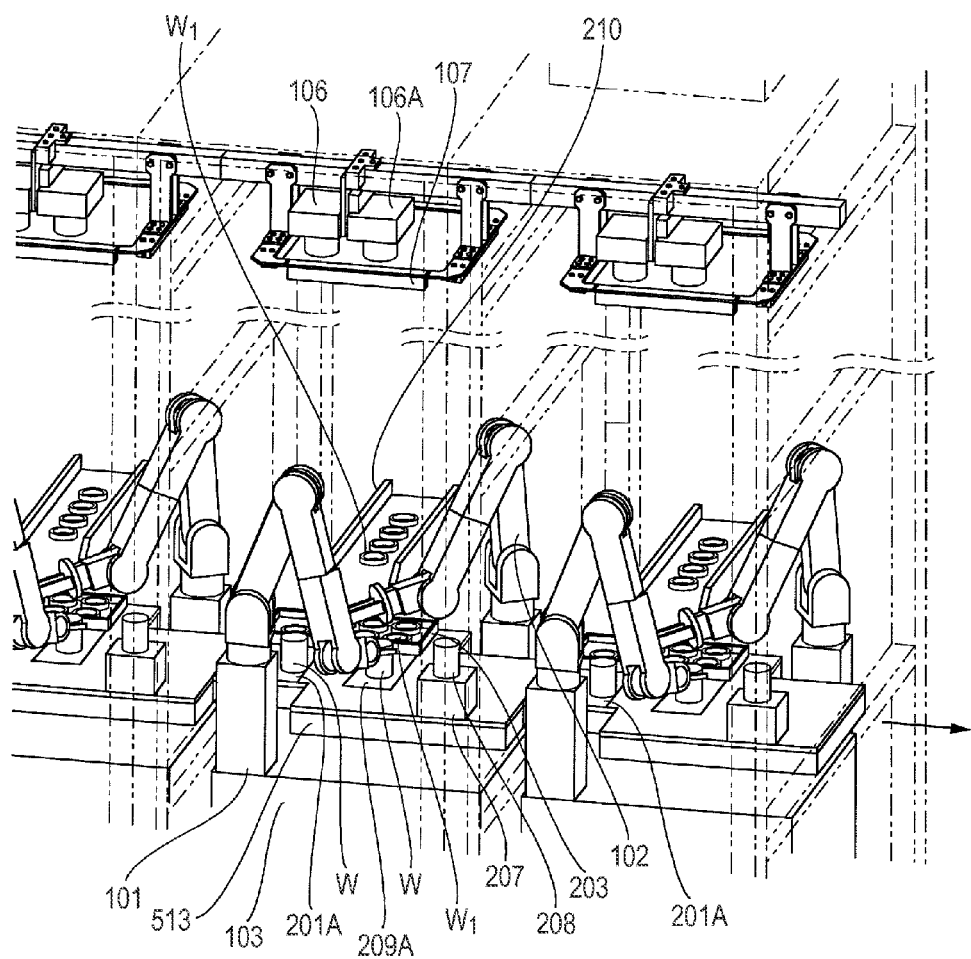
FIG. 7 is a perspective view of the assembling apparatuses in FIG. 6A on an enlarged scale.

FIG. 7 is a perspective view of assembling apparatuses (robot stations) in FIG. 6A on an enlarged scale. Assembly work by each robot station 100A illustrated in FIG. 7 is the same as the assembly work in the first embodiment. However, in the second embodiment, three types of calibration for camera coordinates, workbench coordinates, and robot coordinates are performed, as will be described below. This is because, in contrast to the configuration of the first embodiment in which a pedestal top plate serves as a workspace and mechanical accuracy can be uniquely ensured for working surface coordinates and coordinates of robot arms, the mechanical accuracy cannot be ensured in the second embodiment because the workbench 513 is fixed to the booth 104A. A calibration method according to the second embodiment will be described below. The procedures for the calibration method are performed in the manner below.

(1) Three calibration plates are mounted at non-collinear positions in portions of the working area of the workbench 513 within the viewing coverage of the global camera 106.

(2) A calibration program of the image processing apparatus 109 is activated. After the activation of the program, the global camera 106 automatically images the three calibration plates. The image processing apparatus 109 calculates a parameter correction value for the single camera using the image information by a known calibration method.

(3) The calibration plates are then removed.

(4) The global camera 106 images a mark at a known position made in advance on the workbench 513 a plurality of times. An equation defining the positional relationship between the mark and the workbench 513 is obtained from the relationship between camera coordinates and the position of the mark.

The controller 108 causes the robot arms 101 and 102 to move end effectors attached to the robot arms 101 and 102 to predetermined positions. In this state, a camera-to-robot calibration program is activated. After the activation of the program, the image processing apparatus 109 reads marks made on the end effectors attached to the robot arms 101 and 102, calculates the positional relationship between the end effectors of the robot arms, and obtains an equation for conversion from camera coordinates.

(6) The above-described work is similarly performed for the local camera 106A. In this manner, an equation representing the positional relationship among each of the cameras 106 and 106A, the robot arms 101 and 102, and the workbench 513 is constructed.

In the second embodiment, pieces of calibration work, the number of which is larger than in the first embodiment are required. However, since the position of a workpiece, a target position for a workpiece, and the like can be obtained through imaging in an environment subjected to the least amount of vibration from the robot arms 101 and 102, the second embodiment is advantageous in that the cameras 106 and 106A each have high detection position accuracy. In the case of imaging at a stationary position, the second embodiment has the advantage of being able to use a camera using an inexpensive CMOS sensor which performs imaging with, e.g., a rolling shutter. Under the assumption of the absence of swings, use of camera coordinates is not limited to the above-described use of a relative position in an image. Camera coordinates of images can be used in combination. It is thus possible to significantly shorten the process of image processing.

Specific taught operations according to the second embodiment are as follows.

(1) The robot arm 102 is moved, and a workpiece W which is a lens barrel (an object to be machined) fed from the adjacent robot station 100A is gripped with the end effector. The end effector conveys the workpiece W to the assembly working area 209A and fixes the workpiece W to a predetermined position. The global camera 106 is used here. The global camera 106 images a workpiece W in the area 201A where a workpiece W is to be temporarily placed. An image obtained through the imaging is fed to the image processing apparatus 109, and the center coordinates of the workpiece W are passed to the controller 108. The controller 108 calculates the robot coordinates of the center position of the workpiece W based on the above-described relational equations and calculates the value of a difference between the robot coordinates and a taught position for a lens barrel taught in advance. The controller 108 adds the value as an offset to a later teach command, instructs the robot arm 102 to move to a position for picking up the workpiece W, and grips the workpiece W. After that, the controller 108 instructs the robot arm 102 to move the workpiece W to the predetermined position and releases the workpiece W at the position.

(2) When the workpiece W is fixed to the predetermined position, the robot arm 101 is moved. The robot arm 101 grips a wiring member jutting out from the workpiece W with the end effector and turns up the wiring member to a position at an upper portion of the workpiece W. The local camera 106A is used here. The local camera 106A simultaneously images the wiring member jutting out from the workpiece W placed in the working area 209A and the workpiece W. In this state, the workpiece W and wiring member are rotated by rotating a rotating table provided in advance on the workbench 513 such that a taught image of the workpiece W and wiring member coincides with an image obtained through the imaging. When the images coincide, the controller 108 performs coordinate conversion using the equation representing the relationship between robot coordinates and camera coordinates. The turning-up operation is performed by detecting a difference between the center coordinate position of the workpiece W and a center coordinate position taught in advance for a workpiece W and adding the value of the difference as an offset to a taught operation.

(3) The robot arm 102 is moved to grip a coating apparatus 208 mounted on a stage 207. The gripped coating apparatus 208 is moved to within the working area 209A using the robot arm 102. The global camera 106 is used here. The global camera 106 simultaneously images a marker (not illustrated) made on an upper portion of the coating apparatus 208 and the workpiece W fixed at a predetermined position. An image obtained through the imaging is fed to the image processing apparatus 109. The image processing apparatus 109 calculates the center camera coordinates of the mark on the coating apparatus 208 and the center camera coordinates of the workpiece W fixed at the predetermined position and sends out the center camera coordinates to the controller 108. The controller 108 converts the camera coordinates into robot coordinates, calculates differences between the sets of robot coordinates and taught center robot coordinates of the mark on the coating apparatus 208 and taught center robot coordinates of the workpiece W fixed at the predetermined position, and corrects teaching data based on the values of the differences.

(4) The distal end of the gripped coating apparatus 208 is moved onto an adhesive application area of the workpiece W. Adhesive is ejected from the coating apparatus 208. The coating apparatus 208 has an application switch at a portion at which the coating apparatus 208 is gripped. The coating apparatus 208 is designed to eject a predetermined amount of adhesive when the coating apparatus 208 is firmly gripped to press the application switch. The local camera 106A is used here. The local camera 106A simultaneously images the workpiece W placed in the working area 209A and the marker made on the coating apparatus 208. An image obtained through the imaging is fed to the image processing apparatus 109, which extracts the application area from the image of the workpiece W obtained through the imaging and calculates the camera position coordinates of the center of the application area. The image processing apparatus 109 then extracts the marker and calculates the center camera position coordinates of the marker. The coordinates are fed to the controller 108. The controller 108 converts the coordinates into robot coordinates and then calculates differences between the sets of robot coordinates and taught center robot coordinates of the application area and taught center camera coordinates of the marker. The controller 108 instructs the robot arm 102 to operate so as to cancel out the values of the differences. After that, adhesive is ejected from the coating apparatus 208.

(5) The robot arm 102 is moved to return the gripped coating apparatus 208 to a predetermined position of the stage 207. The gripper hand serving as the end effector is opened, and the coating apparatus 208 is removed from the robot arm 102. The global camera 106 is used here. A circular hole for mounting the coating apparatus 208 is formed in the stage 207 for fixing the coating apparatus 208. The hole is conical. Even if the coating apparatus 208 is returned with somewhat low accuracy, the coating apparatus 208 fits in at the predetermined position. The global camera 106 images the hole from above. At this time, the marker made on the coating apparatus 208 gripped by the end effector is simultaneously imaged. An image obtained through the imaging is fed to the image processing apparatus 109, which extracts a circular hole area and the marker from the image and calculates the center positions of the circular hole area and marker as camera coordinates. The camera coordinates are fed to the controller 108. The controller 108 calculates differences between the camera coordinates and center robot coordinates of the circular hole and center coordinates of the marker taught in advance. The controller 108 corrects a taught operation for the robot arm 102 from the values of the differences and controls the robot arm 102. The end effector is opened, and the coating apparatus 208 is returned to the predetermined position of the stage 207.

(6) The robot arm 102 is moved, and a workpiece $W_1$ serving as a part to be assembled which is placed in the tray 203 is gripped with the end effector of the robot arm 102. The robot arm 102 is moved to move the workpiece $W_1$ to within the working area 209A. A plurality of workpieces $W_1$ is mounted on the tray 203 without overlaps. The global camera 106 is also used here. The global camera 106 images workpieces $W_1$ mounted on the tray 203 and the workpiece W in the working area 209A and sends out an image obtained through the imaging to the image processing apparatus 109. The image processing apparatus 109 selects a grippable one from among the workpieces $W_1$ based on the image and calculates the camera coordinates of the center position of the grippable workpiece $W_1$. The image processing apparatus 109 also calculates the camera coordinates of the center position of the workpiece W. The calculated camera coordinates are fed to the controller 108. The controller 108 converts the camera coordinates into robot coordinates using the equation for conversion and calculates differences between the sets of robot coordinates and center robot coordinates of the workpiece $W_1$ and center robot coordinates of the workpiece W taught in advance. The controller 108 corrects a taught operation, moves the end effector of the robot arm 102 to a predetermined position, and causes the end effector to grip the workpiece $W_1$. The controller 108 moves the workpiece $W_1$ into the working area 209A where the workpiece W is present using the robot arm 102.

(7) The robot arm 102 is moved, and the workpiece $W_1$ is assembled to the workpiece W placed in the working area 209A. The local camera 106A is used here. The local camera 106A images the workpiece $W_1$ gripped by the end effector and the workpiece W in the working area 209A and sends out an image obtained through the imaging to the image processing apparatus 109. The reason why imaging by the local camera 106A is performed again here is that the workpiece $W_1$ as a member to be attached may be deformed when being gripped to cause the center coordinates to be displaced and that a high degree of accuracy of dimension which cannot be achieved by the global camera 106 is required to assemble the workpiece $W_1$. The image obtained through the imaging by the local camera 106A is fed to the image processing apparatus 109, which calculates the center position of the gripped workpiece $W_1$ and the center position of the workpiece W in the assembly working area 209A as camera coordinates. The calculated camera coordinates are fed to the controller 108. The controller 108 converts the information into robot coordinates using the equation for conversion and detects the values of robot coordinate differences between the sets of robot coordinates and center robot coordinates of the workpiece W and center coordinates of the workpiece $W_1$ taught in advance. The controller 108 corrects a taught operation based on the values of the differences. The controller 108 moves the end effector and assembles the workpiece $W_1$ to the workpiece W according to the corrected taught operation.

(8) The workpiece W having the assembled workpiece $W_1$ is gripped again by the robot arm 102 and is conveyed to the area 201A for temporary placement of the adjacent robot station 100A. The global camera 106 is also used here. An object to be imaged is the workpiece W having the assembled part. An image obtained through the imaging is fed to the image processing apparatus 109, which calculates the center position of the workpiece W as camera coordinates. The calculated camera coordinates are fed to the controller 108. The controller 108 converts the camera coordinates into robot coordinates using the equation for conversion and calculates the value of a difference between the robot coordinates and a center robot coordinate value of the workpiece W taught in advance. The controller 108 corrects a taught operation based on the information, moves the robot arm 102 to a predetermined position, and causes the end effector to grip the workpiece W. The end effector moves the workpiece W to the area 201A of the adjacent robot station 100A. When the end effector reaches the predetermined position, the end effector opens and releases the workpiece W. This is the completion of the taught operations taught to the robot station 100A for one process. The operation returns to procedure (1), and a work process for a new lens barrel which is an object to be machined starts.

As described above, according to the second embodiment, pictures obtained by imaging by the cameras 106 and 106A do not need consideration of the effects of vibrations. The second embodiment is thus advantageous in that it is only necessary to perform operation by normal playback control and correct a difference between a target value and a taught point at every important point. For this reason, programming can be easily performed, and advantageously the robot arms 101 and 102 are not required to have high accuracy.

Third Embodiment

Figure 8A:
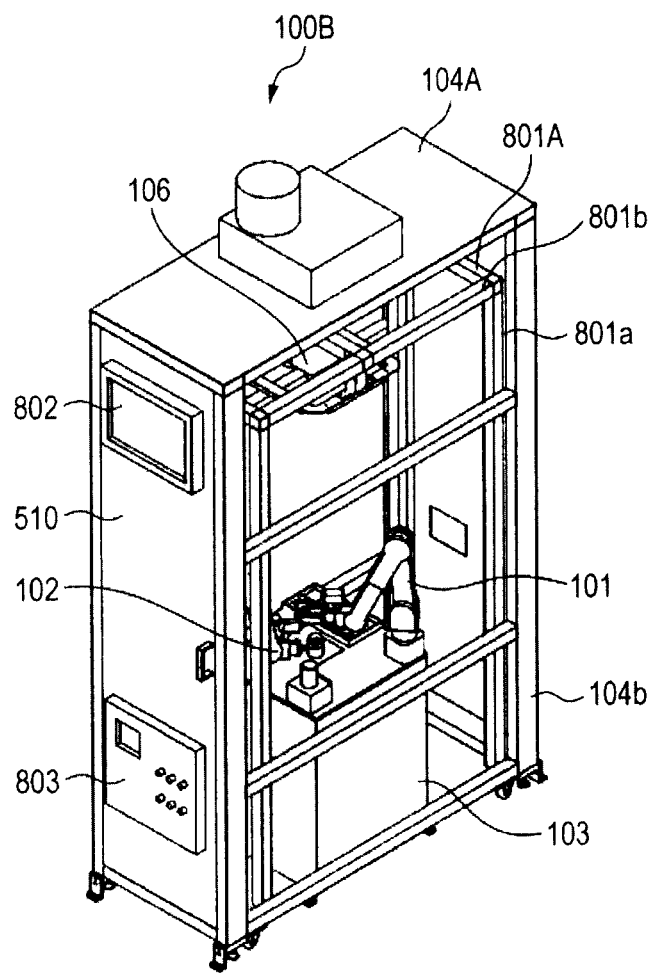
FIG. 8A is a perspective view illustrating the schematic configuration of an assembling apparatus with a door closed to be incorporated in a production system according to a third embodiment of the present invention.
Figure 8B:
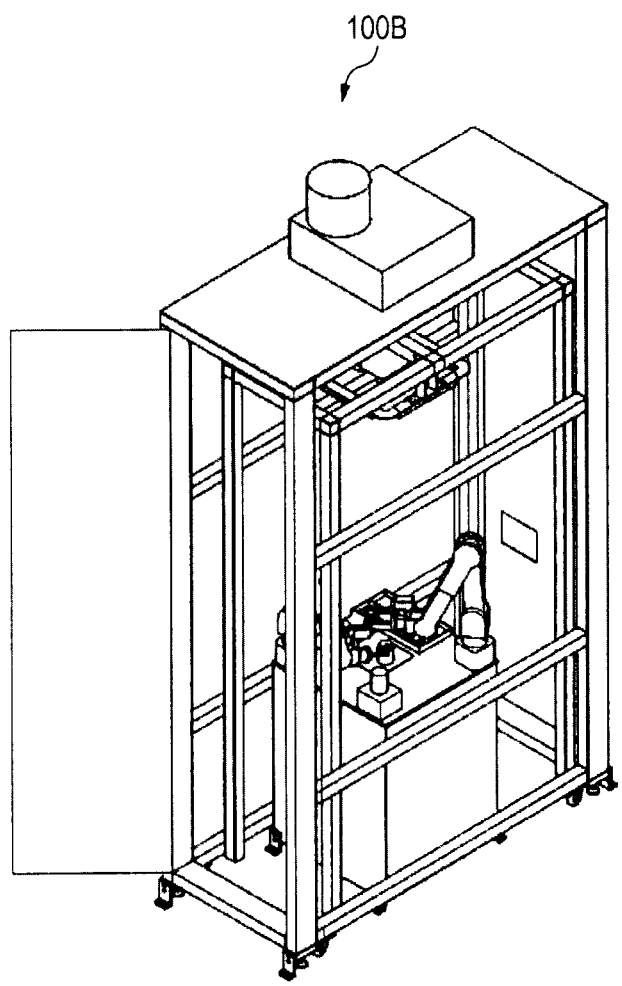
FIG. 8B is a perspective view illustrating the schematic configuration of the assembling apparatus with the door opened to be incorporated in the production system according to the third embodiment of the present invention.

FIGS. 8A and 8B are perspective views illustrating the schematic configuration of an assembling apparatus to be incorporated in a production system according to a third embodiment of the present invention. FIG. 8A is a view showing a state in which a door is closed. FIG. 8B is a view showing a state in which the door is open. The same components as the components in the first embodiment are denoted by the same reference numerals and a description of the components will be omitted.

In a robot station 100B as an assembling apparatus according to the third embodiment, the frame with a framed structure in the robot station as the assembling apparatus according to the second embodiment includes an outer frame and an inner frame, and an inner frame camera stand 801A to which the camera and the luminaire are fixed is provided inside the booth 104A, which is the outer frame. The camera stand 801A includes support posts 801a and reinforcing beams 801b. The structure is such that cameras 106 and 106A are fixed to the reinforcing beams 801b of the camera stand 801A.

Also, the structure is such that the support posts 801a are fixed to the floor surface while being out of contact with the pedestal 103 and also being out of contact with the support posts 104b. The booth 104A, the camera stand 801A and the pedestal 103 are fixed to the floor surface independently of each other.

The robot station 100B according to the third embodiment has a transparent door 510 fixed to the support post 104b of the booth 104A. A display 802 for displaying the states of the controller and the image processing apparatus incorporated in the pedestal 103 is mounted on the door 510.

In the display 802, a touch panel is incorporated to enable display of further detailed information by touching a state display portion and to enable switching between a view for the controller and a view for the image processing apparatus. On the door 510, a robot arm teaching apparatus 803 is also provided detachably. The teaching apparatus 803 is provided with an emergency stop switch.

This arrangement enables teaching and state checking on each robot station without opening the door of the robot station and therefore enables maintenance of a certain degree of cleanness in the robot station assembling apparatus. Also, the disposition of a necessary panel including an instruction panel in the front face of the robot station enables realization of an assembling apparatus compact and having improved space efficiency.

In the robot station 100B thus arranged, in a period for testing such as debugging, operator's touching the above-described display 802 and teaching apparatus 803 when the robot arm is operating or during taking of images with the cameras is of daily occurrence. There is also a possibility of an operator inadvertently touching the booth 104A in an operation such as a component part resupply operation. In the above-described second embodiment, therefore, there is a risk of accidental vibration being transmitted to the camera to cause a malfunction.

In the robot station 100B as an assembling apparatus according to the third embodiment, however, the camera stand 801A is fixed to the floor surface independently of the booth 104A and out of contact with the same.

Therefore, even when vibration of the booth 104A is caused by an accidental external force, it is not transmitted to the camera stand; image taking with the camera can be performed with stability. Thus, the operator can check the operation and the state of teaching without anxiety even during the operation of the robot by using the display 802 and the teaching apparatus 803.

Thus, prevention of troubles in the operation of robot station is enabled to obtain the effect of improving the availability of the robot station and a robot cell formed by combining the robot stations.

In the third embodiment, wiring not illustrated in the drawings is required and, because it is necessary to consider transmission of vibrations throughout the wiring, there is a need to fix the wiring connected from the controller in the pedestal 103 to the display 802 and the wiring connected from the controller to the teaching apparatus 803 so that the wiring does not contact the camera stand. Also, the arrangement is such that the cables connected from the image processing apparatus to the cameras 106 and 106A are temporarily fixed to the floor surface with play and thereafter connected via the camera stand.

Figure 9:
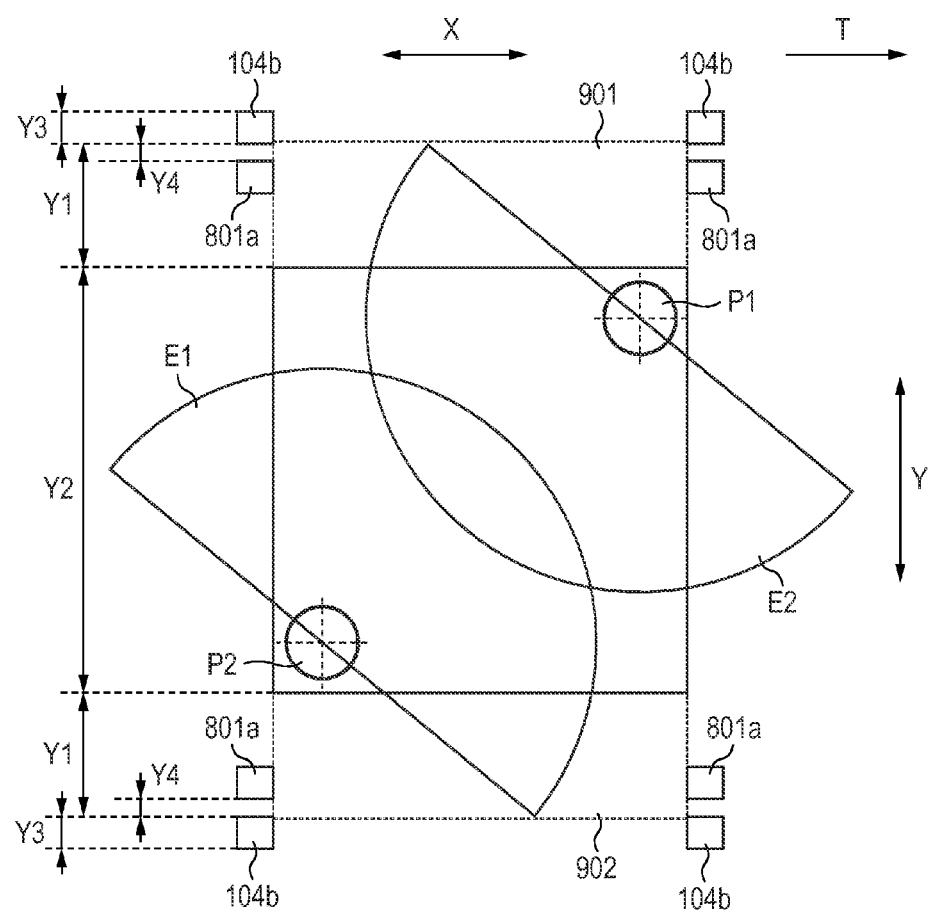
FIG. 9 is a schematic view of the assembling apparatus as viewed from above.

FIG. 9 is a schematic view of the assembling apparatus (robot station) as viewed from above and illustrates the positional relationship among the pedestal 103, the robot arms 101 and 102 and the booth 104A and a position where the camera stand 801A is installed.

Referring to FIG. 9, a point P1 indicates the rotation center of a first axis of the robot arm 101 while a point P2 indicates the rotation center of a first axis of the robot arm 102. A range E1 indicates a range of movement which the end effector of the robot arm 101 covers when the first axis of the robot arm 101 is pivoted. Similarly, a range E2 indicates a range of movement which the end effector of the robot arm 102 covers when the first axis of the robot arm 102 is pivoted.

In the third embodiment, the booth 104A is sized so as not to contact the pedestal 103 and the robot arms 101 and 102 even when the pedestal 103 and the robot arms 101 and 102 vibrate. More specifically, let Y1 be a maximum length by which each of the robot arms 101 and 102 protrudes from the pedestal 103 in the long side direction Y in a plan view; Y2, a length in a direction perpendicular to the workpiece conveying direction T of the pedestal 103; and Y3, a width of each support post 104b of the booth 104A in the direction perpendicular to the workpiece conveying direction T, as illustrated in FIG. 9. From this, the length y in the long side direction of the booth 104A is set to Y1×2+Y2 or longer. On the other hand, the camera stand 801A cannot be made larger than the booth 104A, while it is preferable, from the viewpoint of stability of the camera under vibration, to install the camera stand 801A with an installation area increased as large as possible. From this, it is desirable to install the support posts 801a of the camera stand 801A by spacing the support posts 801a apart from the support posts 104b of the booth by a clearance Y4 such that the support posts 801a do not contact the support posts 104b during vibration. From this, it is necessary to set the length y1 in the long side direction of the camera stand 801A within a range of Y1×2+Y2−Y4×2. On the other hand, it is necessary, for prevention of contact with the pedestal, that the length y1 in the long side direction be equal to or larger than Y2+2×Y4.

Because of the need to fully cover the camera stand 801A, it is necessary to set the height of the booth higher than that of the camera stand by an amount equal to or larger than the clearance Y4 for prevention of contact. While satisfying this requirement, it is necessary to set the height of the camera stand equal to the sum of the maximum height that the robot arms 101 and 102 can reach, the height of the pedestal 103, the dimension for installing the cameras 106 and 106A, and the width Y3 of each support post 104b. The pedestal 103 is installed at a central portion of an area where the booth 104A is installed. A workbench on which a workpiece is mounted may be fixed to one of the outer frame and the inner frame while being out of contact with the pedestal.

Spaces indicated by broken-line areas 901 and 902 are thereby formed between the pedestal 103 and the booth 104A, as illustrated in FIG. 9. The broken-line areas 901 and 902 are provided to prevent the robot arms 101 and 102 from protruding from the booth 104A in the long side direction Y and to increase the footprints of the booth 104A and the camera stand 801A in the direction Y.

As a result, each of the booth 104A and the camera stand 801A is structurally strengthened against a force applied in the direction Y to be stronger against a swing in the direction Y. Also, the booth in the direction of extension serves as a safeguard fence in robot apparatuses heretofore known.

A plurality of robot stations corresponding to this robot station are used by being connected in the workpiece conveying direction T. Therefore, a force applied in the conveying direction T is received by the whole of the plurality of robot stations. Thus, the robot station is also made stronger against a swing in the direction T and the entire robot cell as a whole is strengthened against vibrations.

The present invention is suitably applied to a robot cell provided to include a plurality of consecutively connected robots.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2010-146197, filed Jun. 28, 2010, and No. 2011-130513, filed Jun. 10, 2011 which are hereby incorporated by reference herein in their entirety.

The invention claimed is:

1. An assembling apparatus including a robot arm and a pedestal to which the robot arm is fixed, comprising:
a frame which is arranged to surround the pedestal; and
a camera which is fixed at an upper portion of the frame and can image an area including a working area for the robot arm,
wherein the pedestal and frame are fixed to a floor surface independently and out of contact with each other, such that vibrations caused by the movements of the robot arm are not directly transmitted to the frame, whereby the vibration of the camera can be reduced, and
the frame is formed in a shape of a rectangular parallelepiped having a short side along a workpiece conveying direction in the assembling apparatus and a long side intersecting the workpiece conveying direction, length of the long side of the frame being set to be not less than the sum of a maximum length by which the robot arm protrudes from the pedestal in a direction perpendicular to the workpiece conveying direction and length in the direction perpendicular to the workpiece conveying direction of the pedestal.

2. The assembling apparatus according to claim 1, wherein a top board is provided above the camera at the upper portion of the frame.

3. The assembling apparatus according to claim 2, wherein a side board having an opening portion for carrying in and carrying out a workpiece is provided at a frame side surface of the frame.

4. The assembling apparatus according to claim 3, wherein a duct for feeding clean air into a space surrounded by the frame is provided at the top board.

5. The assembling apparatus according to claim 4, wherein a workbench on which a workpiece is to be mounted is fixed to the frame while being out of contact with the pedestal.

6. An assembling apparatus including a robot arm and a pedestal to which the robot arm is fixed, comprising:
a frame which includes an inner frame and an outer frame for preventing application of external force to the inner frame, and which is arranged to surround the pedestal; and
a camera which is fixed at an upper portion of the inner frame and can image an area including a working area for the robot arm,
wherein the pedestal and frame are fixed to a floor surface independently and out of contact with each other, such that vibrations caused by the movements of the robot arm are not directly transmitted to the frame, whereby the vibration of the camera can reduced, and the outer frame is formed in a shape of a rectangular parallelepiped having a short side along a workpiece conveying direction in the assembling apparatus and a long side intersecting the workpiece conveying direction, a length of the long side of the outer frame being set to be not less than the sum of a maximum length by which the robot arm protrudes from the pedestal in a direction perpendicular to the workpiece conveying direction and a length in the direction perpendicular to the workpiece conveying direction of the pedestal, a length of the inner frame being set to be smaller than that of the outer frame by an amount corresponding to a clearance for prevention of transmission of vibration.

7. The assembling apparatus according to claim 6, wherein a top board is provided above the camera at the upper portion of the outer frame.

8. The assembling apparatus according to claim 7, wherein a side board having an opening portion for carrying in and carrying out a workpiece is provided at a frame side surface of the outer frame.

9. The assembling apparatus according to claim 8, wherein a duct for feeding clean air into a space surrounded by the outer frame is provided at the top board.

10. The assembling apparatus according to claim 9, wherein a workbench on which a workpiece is to be mounted is fixed to one of the outer frame and the inner frame while being out of contact with the pedestal.

11. A production system comprising a plurality of assembling apparatuses according to claim 1, wherein the plurality of assembling apparatuses are arranged side-by-side along the workpiece conveying direction.

12. A production system comprising a plurality of assembling apparatuses according to claim 6, wherein the plurality of assembling apparatuses are arranged side-by-side along the workpiece conveying direction.

\* \* \* \* \*